United States Patent [19]

Nishikawa et al.

[11] Patent Number: 4,693,927
[45] Date of Patent: Sep. 15, 1987

[54] MAGNETIC RECORDING MEDIUM AND PROCESS FOR PRODUCING THE SAME

[75] Inventors: Yasuo Nishikawa; Tsutomu Okita, both of Odawara; Yoshito Mukaida, Ninomiya; Kenji Yanagihara; Mituo Kimura, both of Yokohama; Masahiro Niinomi, Machida, all of Japan

[73] Assignee: Fuji Photo Film Company Limited, Minami-ashigara, Japan

[21] Appl. No.: 712,095

[22] Filed: Mar. 15, 1985

[30] Foreign Application Priority Data

Mar. 19, 1984 [JP] Japan ................................. 59-53047
Mar. 19, 1984 [JP] Japan ................................. 59-53048

[51] Int. Cl.$^4$ ............................................. G11B 5/72
[52] U.S. Cl. ..................................... 428/216; 427/41; 427/128; 427/131; 427/132; 428/336; 428/421; 428/422; 428/447; 428/461; 428/463; 428/694; 428/900
[58] Field of Search .................. 427/44, 128, 131, 41, 427/132; 428/694, 215, 216, 336, 900, 461, 447, 422, 421, 523, 463; 360/134–136

[56] References Cited

U.S. PATENT DOCUMENTS

| | | | |
|---|---|---|---|
| 4,419,404 | 2/1982 | Arai | 428/694 |
| 4,521,482 | 6/1983 | Arai | 428/336 |
| 4,565,734 | 1/1986 | Arai | 428/336 |
| 4,582,746 | 4/1986 | Shirahata | 428/336 |
| 4,599,266 | 7/1986 | Nakayama | 427/41 |
| 4,601,950 | 7/1986 | Iida | 428/694 |
| 4,636,435 | 1/1987 | Yanagihara | 427/41 |

Primary Examiner—Ellis P. Robinson
Attorney, Agent, or Firm—Oblon, Fisher, Spivak, McClelland, & Maier

[57] ABSTRACT

A magnetic recording medium has an improved protective film covering a thin magnetic metal thin film provided on a non-magnetic support. The protective film consists of a plurality of layers formed by plasma polymerization, the base layer of which has a density of 0.7 to 1.5 g/cm$^3$ and the surface layer of which has a density of not less than 1.2 g/cm$^3$. This magnetic recording medium has good scratch resistance, weather resistance and abrasion resistance in addition to extremely small spacing loss. The magnetic recording medium can be produced by plasma polymerization of a wide variety of monomeric compounds.

15 Claims, 4 Drawing Figures

MAGNETIC RECORDING MEDIUM AND PROCESS FOR PRODUCING THE SAME

BACKGROUND OF THE INVENTION

1. Field of the Invention

The present invention relates to a magnetic recording medium comprising a thin magnetic metal film as a magnetic recording layer, and particularly to a magnetic recording medium provided with an improved protective layer.

2. Description of the Prior Art

As magnetic recording media such as audio tapes and video tapes, there have been widely used coated-type media which are obtained by coating a non-magnetic support with a powdery magnetic material such as a magnetic oxide or a ferromagnetic alloy in an organic binder, followed by drying. Recently, however, much attention has been paid to the use of thin metal film type magnetic recording media, in place of the coated-type media, as practical media for high-density recording. The thin metal film type magnetic recording medium has a thin film of a ferromagnetic metal, e.g., a Co-Ni alloy provided on a support as a magnetic recording layer. A magnetic recording layer of this type is formed from a ferromagnetic metal having a saturation magnetization higher than that of a magnetic oxide powder or the like, without the use of any binder or the like; therefore, such a layer is very advantageous from the viewpoint of electromagnetic conversion characteristics and is expected to realize high-density recording.

However, the thin metal film type magnetic recording media encounter the following problems: (1) since a magnetic recording medium is placed in frictional contact with the magnetic head, guide poles, etc. during recording, reproduction and erasing of magnetic signals, and in particular a video tape is subjected to repeated mechanical shocks in reproducing a still image, the magnetic recording medium should have a low coefficient of friction, high abrasion resistance and high scratch resistance, but the conventional thin metal film type magnetic recording media have low coefficients of friction with the magnetic head, etc. and are low in both abrasion resistance and scratch resistance, so that the magnetic recording layer thereof is liable to be damaged; (2) the thin metal type magnetic recording media are easily corroded by adverse environmental conditions due to their low weather resistance.

To overcome the abovementioned problems, attempts have been made to provide a protective film on a thin metal film type magnetic recording medium. For this purpose, a method of applying a film of organic lubricant on the thin metal film (Japanese Laid-open Patent Publication No. 75001/1975) and a method of providing a protective film of a lubricant such as a metal or a metal oxide on the thin metal film (Japanese Laid-open Patent Publication No. 39708/1978 and No. 40505/1978) have been proposed. However, although these methods are effective to some extent, the effects are not long-lasting and, accordingly, the methods are not practical.

Another method has been proposed in which the magnetic metal layer is coated with a polymeric substance such as a copolymer of vinylidene chloride and an acrylic acid ester (Japanese Laid-open Patent Publication No. 155010/1979). However, since the coating has a large thickness of about 0.2 μm, the spacing loss will be great, which causes a reduction in output and makes the magnetic recording medium unsuitable for high-density recording.

Still another method has been proposed in which a plasma-polymerized film of a single-layer construction is provided as a protective layer (Japanese Laid-open Patent Publication No. 135442/1982 and No. 102330/1983). This method makes it possible to form a protective film which is relatively tough and has good adhesion to the thin magnetic metal film. In addition, a protective film having an extremely small thickness of 0.1 μm or less can be provided, so that the spacing loss can be reduced to a negligible level. However, conventional protective films formed by plasma polymerization have been unable to enhance both scratch resistance and weather resistance of the thin metal film type magnetic recording media.

SUMMARY OF THE INVENTION

An object of this invention is to provide a thin metal film type magnetic recording medium comprising a protective film consisting of a plasma-polymerized film which has good scratch resistance and weather resistance.

Another object of this invention is to provide a thin metal film type magnetic recording medium comprising a protective film having high abrasion resistance and an extremely small spacing loss in addition to good scratch resistance and good weather resistance.

Still another object of the invention is to provide a process for producing such a thin metal film type magnetic recording medium.

We have found that the abovementioned objects can be attained by forming by plasma polymerization a protective film comprising a surface layer and a base layer each having fixed densities.

This invention provides a magnetic recording medium comprising a non-magnetic support, a thin magnetic metal film provided on said support and a protective film formed on said thin magnetic film, wherein the protective film consists of a plurality of layers formed by plasma polymerization and comprises a base layer directly formed on said thin magnetic metal film and having a density of from 0.7 to 1.5 g/cm$^3$ and a surface layer, that is, the most upper layer, having a density of not less than 1.2 g/cm$^3$.

The protective film of the magnetic recording medium according to this invention has high scratch resistance and high weather resistance, unlike conventional protective films formed by plasma polymerization. Further, the protective film according to this invention has good toughness and abrasion resistance, like the conventional protective films formed by plasma polymerization, and is substantially free of spacing loss because it can be formed in an extremely small thickness.

BRIEF DESCRIPTION OF THE DRAWINGS

In the accompanying drawings.

DETAILED DESCRIPTION OF THE INVENTION

Figure 1:
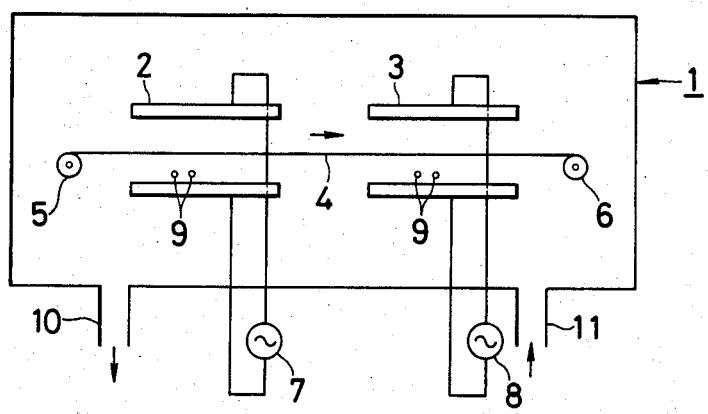
FIG. 1 shows schematically an apparatus used for forming a protective film of a magnetic recording medium by plasma polymerization.

The protective film according to this invention comprises a base layer and a surface layer, and optionally comprises at least one intermediate layer. Two adjacent layers may be distinguished from each other by chemical characteristics such as chemical constitution and/or physical characteristics such as density. In some cases, the two adjacent layers have the same chemical and physical characteristics, but are distinguished from each other by an interface present therebetween.

The surface layer of the protective film of this invention has a density of 1.2 g/cm$^3$ or higher, preferably from 1.4 to 2.2 g/cm$^3$. If the density of the surface layer is less than 1.2 g/cm$^3$, no improvement of scratch resistance can be expected. On the other hand, the base layer directly formed on the thin magnetic metal film has a density of from 0.7 to 1.5 g/cm$^3$, preferably from 0.7 to 1.2 g/cm$^3$. If the density of the base layer is less than 0.7 g/cm$^3$, it is difficult to form the base layer in a uniform thickness, and, on the other hand, a density of higher than 1.5 g/cm$^3$ makes it impossible to improve sufficiently the weather resistance of the thin magnetic metal film. The density of the intermediate layer provided optionally is not specifically restricted, and may be generally in the range of from 0.7 to 1.7 g/cm$^3$.

The thickness of the surface layer of the protective film is preferably from 3 to 450 Å. In particular, a thickness of 50 Å or less will further improve the scratch resistance. The thickness of the base layer is preferably from 10 to 450 Å. If the thickness of the surface layer is less than 3 Å, the scratch resistance will be insufficient, and if the thickness of the base layer is less than 10 Å, the weather resistance will be insufficient. The total thickness of the protective film is preferably not greater than 500 Å. A total thickness which exceeds 500 Å may lead to a considerably large spacing loss.

The non-magnetic support used may be made of any of various materials including cellulose acetate; cellulose nitrate; ethyl cellulose; methyl cellulose; polyamide; polymethyl methacrylate; polytetrafluoroethylene; polytrifluoroethylene; homopolymers or copolymers of α-olefins such as ethylene or propylene; homopolymers or copolymers of vinyl chloride; polyvinylidene chloride; polycarbonate; polyimide; polyamide-imide; polyesters such as polyethylene terephthalate; and so on.

The thin magnetic metal film of the magnetic recording medium according to this invention may be formed by vapor deposition methods or plating methods. Vapor deposition methods include the vacuum evaporation method, the sputtering method, the ion plating method, the ion beam deposition method and the chemical vapor deposition method. The plating method may be an electric plating method or an electroless plating method. Materials usable for the thin magnetic metal film include ferromagnetic metals such as Fe, Co or Ni and alloys thereof, particularly Fe-Si, Fe-Rh, Fe-V, Fe-Ti, Co-P, Co-B, Co-Si, Co-V, Co-Y, Co-Sm, Co-Mn, Co-Ni-P, Co-Ni-B, Co-Cr, Co-Ni-Cr, Co-Ni-Ag, Co-Ni-Pd, Co-Ni-Zn, Co-Cu, Co-Ni-Cu, Co-W, Co-Ni-W, Co-Mn-P, Co-Sm-Cu, Co-Ni-Zn-P, Co-V-Cr, etc. Preferably, the thin magnetic metal film contains 50% by weight or more of Co.

The thickness of the thin magnetic metal film is generally from 0.02 to 5 μm, preferably from 0.05 to 2 μm. The thickness of the support is preferably from 4 to 50 μm. In order to enhance the adhesion and magnetic properties of the thin magnetic metal film, an undercoat layer may be provided on the support. In addition, a backcoat layer may be provided on the side of the support opposite to the thin magnetic metal film.

For the monomeric compounds used for forming the protective film according to the invention, almost any compound can be used which is capable of forming a film by plasma polymerization. Such monomeric compounds include, for example, linear or cyclic saturated hydrocarbons having up to 10 carbon atoms such as methane, ethane, propane, butane, pentane, octane and cyclohexane; linear or cyclic unsaturated hydrocarbons having up to 10 carbon atoms such as ethylene, propylene, butadiene, benzene, styrene, acetylene and allene; nitrogen-containing organic compounds such as allylamine, methylamine, ethylamine, pyridine, picoline and acrylamide; sulfur-containing organic compounds such as carbon disulfide, methyl mercaptan and ethyl mercaptan; silicon compounds substituted by at least one selected from hydrocarbon radicals and halogen such as monomethylsilane, dimethylsilane, trimethylsilane, tetramethylsilane, diallylsilane, diallyldimethylsilane, monofluorosilane, difluorosilane, trifluorosilane, tetrafluorosilane, propylmethyldivinylsilane, octylsilane, divinyltetramethylsilane, bisdimethylsilylbenzene and decamethylcyclopentasiloxane; halogenated hydrocarbons having 1 to 4 carbon atoms such as monofluoromethane, difluoromethane, trifluoromethane, tetrafluoromethane, monofluoroethylene, difluoroethylene, trifluoroethylene, tetrafluoroethylene, monofluoroethane, difluoroethane, trifluoroethane, tetrafluoroethane, pentafluoroethane, hexafluoroethane, monofluoropropylene, difluoropropylene, trifluoropropylene, tetrafluoropropylene, pentafluoropropylene, hexafluoropropylene, monofluorobutadiene, difluorobutadiene, trifluorobutadiene, tetrafluorobutadiene, pentafluorobutadiene, hexafluorobutadiene, monochloromethane, dichloromethane, trichloromethane, tetrachloromethane, monochloroethylene, dichloroethylene, trichloroethylene, tetrachloroethylene, monochloropropylene, dichloropropylene, trichloropropylene, tetrachloropropylene, pentachloropropylene, hexachloropropylene, monochloroethane, dichloroethane, trichloroethane, tetrachloroethane, pentachloroethane, hexachloroethane, monochlorobutadiene, dichlorobutadiene, trichlorobutadiene, tetrachlorobutadiene, pentachlorobutadiene, hexachlorobutadiene and trichlorotrifluoroethane; and mixtures of these monomeric compounds. Of these monomeric compounds, tetrafluoromethane, hexafluoroethane, tetrachloromethane, hexachloroethane, tetrafluorosilane, trichlorotrifluoroethane or the like is used mostly in combination with other monomeric compounds.

When subjecting the abovementioned monomer to plasma polymerization, the monomer may be mixed with a gas of which the molecules are constituted of light elements, such as trifluoroboron, hydrogen boride, hydrogen ($H_2$), nitrogen ($N_2$), oxygen ($O_2$), carbon monoxide, carbon dioxide, ammonia, etc. or an inert gas such as argon, helium, xenon, etc.

Preferred monomers usable for forming the base layer of the protective film according to the invention include saturated aliphatic or alicyclic hydrocarbons having up to 8 carbon atoms such as methane, ethane, propane, butane, pentane, octane and cyclohexane; unsaturated aliphatic hydrocarbons having up to 8 carbon atoms such as ethylene, propylene, butadiene, acetylene and allene; aromatic hydrocarbons having 6 to 8 carbon atoms such as benzene and styrene; fluorinated lower alkanes such as monofluoromethane, difluoromethane, trifluoromethane and tetrafluoromethane; lower organosilanes and lower organosiloxanes such as monomethylsilane, dimethylsilane, trimethylsilane, tetramethylsilane, diallylsilane, diallyldimethylsilane, propylmethyldivinylsilane, octylsilane, divinyltetramethyldisilane, bisdimethylsilylbenzene and decamethylcyclopentasiloxane; fluorinated lower silanes such as monofluorosilane, difluorosilane, trifluorosilane and tetrafluorosilane; and mixtures thereof, provided that tetrafluorosilane or tetrafluoromethane is used in combination with other compounds described above. Particularly preferred are propylene, butadiene, benzene, styrene, methane, ethane, propane, butane, octane, cyclohexane, diallylsilane, diallyldimethylsilane, divinyltetramethyldisilane, propylmethyldivinylsilane, monofluoromethane, difluoromethane, trifluoromethane and mixtures thereof, and mixtures of at least one thereof with tetrafluoromethane and/or tetrafluorosilane.

Preferred monomers usable for forming the surface layer of the protective film according to the invention include saturated or unsaturated aliphatic hydrocarbons having 1 to 4 carbon atoms such as methane, ethane, propane, butane and ethylene; fluorinated or chlorinated, saturated or unsaturated aliphatic hydrocarbons having 1 to 4 carbon atoms such as monofluoromethane, difluoromethane, trifluoromethane, tetrafluoromethane, monofluoroethylene, difluoroethylene, trifluoroethylene, tetrafluoroethylene, monofluoroethane, difluoroethane, trifluoroethane, tetrafluoroethane, pentafluoroethane, hexafluoroethane, monofluoropropylene, difluoropropylene, trifluoropropylene, tetrafluoropropylene, pentafluoropropylene, hexafluoropropylene, monofluorobutadiene, difluorobutadiene, trifluorobutadiene, tetrafluorobutadiene, pentafluorobutadiene, hexafluorobutadiene, monochloromethane, dichloromethane, trichloromethane, monochloroethylene, dichloroethylene, trichloroethylene, tetrachloroethylene, monochloropropylene, dichloropropylene, trichloropropylene, tetrachloropropylene, pentachloropropylene, hexachloropropylene, monochloroethane, dichloroethane, trichloroethane, tetrachloroethane, pentachloroethane, hexachloroethane, trichlorotrifluoroethane, monochlorobutadiene, dichlorobutadiene, trichlorobutadiene, tetrachlorobutadiene, pentachlorobutadiene and hexachlorobutadiene; lower organosilanes and lower organosiloxanes such as monomethylsilane, dimethylsilane, trimethylsilane, tetramethylsilane, diallylsilane, diallyldimethylsilane, propylmethyldivinylsilane, octylsilane, divinyltetramethyldisilane, bisdimethylsilylbenzene and decamethylcyclopentasiloxane; fluorinated lower silanes such as monofluorosilane, difluorosilane, trifluorosilane and tetrafluorosilane; and mixtures thereof, provided that tetrafluoromethane, hexafluoroethane, tetrachloromethane, hexachloroethane, tetrafluorosilane or trichlorotrifluoroethane is used in combination with other compounds described above. Particularly preferred are methane, ethane, propane, ethylene, monomethylsilane, dimethylsilane, trimethylsilane, tetramethylsilane, difluoroethylene, monofluoromethane, difluoromethane, trifluoromethane, monofluorosilane, difluorosilane, trifluorosilane, octylsilane, decamethylcyclopentasiloxane and mixtures thereof, and mixtures of at least one thereof with tetrafluoromethane and/or tetrafluorosilane.

The type of discharge to be used for generation of the plasma is not particularly limited and any of DC discharge, low frequency discharge, high frequency discharge and micro-wave discharge may be used. Also, the reaction device to be used for the plasma polymerization is not particularly limited. Therefore either an internal electrode system or an electrodeless system may be utilized. There is also no limitation on the shape of the electrodes or coil, or on the structure of the cavity or antenna in the case of micro-wave discharge. Any known device for plasma polymerization can be utilized.

The plasma polymerization for forming the base layer of the protective film of this invention is preferably carried out under the conditions of a pressure of from 20 to 1000 mTorr, an energy density (electric power supplied divided by the volume of the plasma zone, which volume is, for example, the volume of the space between parallel flat plate type electrodes when such electrodes are used) of from 2 to 400 mW/cm$^2$ and an electron temperature of 6000 to 90,000 K., more preferable conditions being a pressure of 20 to 100 mTorr, an energy density of 2 to 200 mW/cm$^2$ and an electron temperature of 6000 to 90,000 K. The electron temperature referred to herein is that measured using a probe for measurement of plasma characteristics as disclosed in Japanese Laid-open Patent Publication No. 135574/1979 and U.S. Pat. No. 4,242,188, the disclosures of which are incorporated herein by reference.

The plasma polymerization for forming the surface layer of the protective film is preferably carried out under the conditions of a pressure of 20 to 1000 mTorr, an energy density of 20 to 600 mW/cm$^2$ and an electron temperature of 6000 to 90,000 K., more preferable conditions being a pressure of 20 to 100 mTorr, an energy density of 40 to 400 mW/cm$^2$ and an electron temperature of 6000 to 90,000 K.

The magnetic recording medium according to this invention can be produced by forming a plurality of layers sequentially on the thin magnetic metal film provided on the support. This process comprises the steps of forming a first layer, on said thin magnetic metal film or on a previously formed layer, by plasma polymerization of a first monomer gas and forming a second layer on said first layer, which is distinguishable from said first layer.

In a preferred embodiment of the process, a single monomer gas is used and two or more plasma zones differing in energy density are provided in a reaction chamber, and the support is passed through the plasma zones. In this case, said first and the second monomer gases are the same in composition but the plasmas of the first monomer gas and the second monomer gas differ in energy density, thereby producing the first and the second layers adjacent to each other which differ in physical and/or chemical characteristics.

In another preferred embodiment, the first and the second monomer gases differ in composition, thereby producing the first and the second layers which differ in chemical constitution. This embodiment can be carried out by passing the support through a first reaction chamber where plasma of the first monomer gas is generated and then passing it through a second reaction chamber where plasma of the second monomer gas is generated.

In still another embodiment of the process, the first layer formed is exposed to oxygen, air or the like before the formation of the second layer, thereby producing the first and second layers partitioned from each other by a modified interface therebetween. In this case, if the first and second layers are formed from the same monomer gas under the same conditions, the two layers formed are the same in chemical and physical characteristics.

The thickness of the protective film of the invention can be measured by, for example, an ellipsometer. In addition, the thickness and density of each constituent layer of the protective film can be determined by, for example, in the case the surface layer, etching away the surface layer and determining the change in the weight of the specimen and the change in the thickness of the protective layer brought about by the removal of the surface layer. It is possible to etch a certain layer of the protective film down to the boundary between the layer and a layer directly thereunder, by etching the protective film with an argon ion beam or the like while monitoring a spectrum obtained by Electron Spectro Chemical Analysis (ESCA). In this case, the removal of the upper layer can be confirmed based on a change in the ESCA spectrum as follows: (1) When the upper layer and the layer directly thereunder differ in chemical constitution, namely, the kind of constituent elements, it is possible to detect the end point of etching, namely, the removal of the upper layer, as a change in the spectrum. For instance, when the upper layer contains fluorine atoms and the lower layer does not, the peak of the $F_{1S}$ electron is gradually reduced with the progress of etching and, finally, becomes too small to detect. A fairly good approximation can be attained by regarding as the end point the stage where the peak area is 1/e (about 1/2.7) of that before etching. (2) When the upper layer and the lower layer are the same in the kind of constituent elements but differ in chemical constitution or density, it is possible to detect the end point as a change in the position and shape (typically, half width) of the peak for a specified electron of a specified element. For instance, when both of the layers contain carbon atoms, the half width of the $C_{1S}$ peak for one of the layers is different from that for the other layer, so that the half width of the peak detected shows a change (an increase or a decrease) when etching proceeds to the boundary between the layers. Therefore, the moment such change ceases can be regarded as the end point of the etching. (3) When the upper layer and the lower layer are the same in both chemical constitution and density and, for example, an oxidation-modification interface is present at the boundary, the ratio of the peak of the $O_{1S}$ electron to that of the $C_{1S}$ electron ($O_{1S}/C_{1S}$) shows a maximum at the interface, which makes it possible to confirm the end point of the etching of the upper layer.

The above methods are means for determining the thickness of each layer of a protective film consisting of a plurality of layers previously formed. The thickness of each layer can also be determined at a production stage, for example, by forming a plasma polymerized layer on a silicon wafer under the same conditions in the course of the formation of a layer constituting the protective film according to the invention and measuring the thickness of the layer with an ellipsometer each time a new layer is formed.

The magnetic recording medium of this invention may take various forms such as tape, sheet, card or disc. Generally, the medium is in the form of a tape.

This invention will now be described more in detail with reference to the following nonlimitative Examples.

EXAMPLE 1

The device used in this example is shown in FIG. 1. Into a 2000-l reaction vessel 1 are placed one set of a first pair of electrodes 2 and one set of a second pair of electrodes 3 of the parallel flat plate type, each set consisting of flat stainless steel plates measuring 50×50 cm with a spacing between the plates of 10 cm. A base material tape 4 of 10 cm in width, comprising a thin magnetic metal film previously formed on a support, is fed out from a roll 5 and is passed between the plates of the electrodes 2 and 3 to be taken up on a roll 6. The electrodes 2, 3 are supplied with an AC current (10 KHz) from power sources 7 and 8 respectively. The electron temperature in the vicinity of the tape 4 being subjected to plasma polymerization is measured by a probe as disclosed in Japanese Laid-open Patent Publication No. 135574/1979 and U.S. Pat. No. 4,242,188 and is controlled. For this purpose, a probe 9 is disposed between the electrode plates of each electrode set. To a part of the bottom of the reaction vessel 1 is connected a gas discharge pipe 10, while a pipe 11 for feeding a monomer gas is connected to another part of the bottom, and the pipes are equipped with flow control valves (not shown). On a side wall of the vessel 1, a pressure indicator (not shown) is provided for measuring the pressure in the vessel and controlling it to the desired value. In operating the device, the reaction vessel is evacuated through the gas discharge pipe 10, and then a monomer gas is introduced through the feeding pipe at a desired flow rate. The pressure in the vessel is controlled by regulating the gas discharge rate, and electric power is supplied to the electrode to generate plasma for effecting polymerization.

On the surface of a base material tape obtained by forming by oblique evaporation a thin magnetic metal film (thickness 1000 Å) of a Co-Ni alloy (Ni content: 20 wt.%) on a surface of a polyethylene terephthalate film of 10 cm in width and 12 μm in thickness, a protective film was formed under the following conditions.

Butane, as a monomer gas, was introduced into the reaction vessel 1 at a constant flow rate of 200 cc (STP)/min, and plasma polymerization was conducted at a controlled pressure of 50 mTorr. The first electrodes 2 are supplied with AC power of 2 kW, and the second electrodes 3 with AC power of 10 kW. The electron temperature during polymerization was from $1.5 \times 10^4$ to $2.5 \times 10^4$ K. on the side of the first electrodes 2 and from $5.5 \times 10^4$ to $6.5 \times 10^4$ K. on the side of the second electrodes 3. The feed rate of the base material tape was controlled to 200 cm/min. As a result, a magnetic recording medium having a plasma-polymerized protective film formed on the thin magnetic metal film of the tape was obtained, in which the protective film consisted of a base layer of 80 Å in thickness and a surface layer of 120 Å in thickness. The density of the base layer was 1.0 g/cm³, and that of the surface layer was 1.6 g/cm³. The thicknesses and densities of the base layer and the surface layer were determined by the method described below. Scratch resistance, weather resistance and the adhesive strength of the protective film to the magnetic metal film of the magnetic recording medium thus obtained were determined by the evaluation method described below. The results are given in Table 1.

(1) Scratch Resistance

The magnetic recording medium obtained was cut into a tape 12.65 mm (0.5 inch) wide. A 50 m length of this tape was loaded in a home-use VHS type VTR (Model: NV-8200, produced by Matsushita Electric Industrial Co., Ltd.), and running (in playing condition) in a standard mode at a temperature of 23° C. and a relative humidity of 70% for 5 min was repeated 300 times. After running, the surface of the specimen was observed under a loupe, and the number of scratches of 12.65 mm (0.5 inch) or longer formed per 12.65-cm (5-inch) length was counted.

(2) Weather Resistance

After preserving a specimen of the magnetic recording medium at a temperature of 50° C. and a relative humidity of 90% for one week, the surface of the specimen was observed under a microscope, and the weather resistance was evaluated in terms of the percentage of the area of discolored regions to the total surface area.

(3) Adhesive Strength of Protective Film

Figure 2:
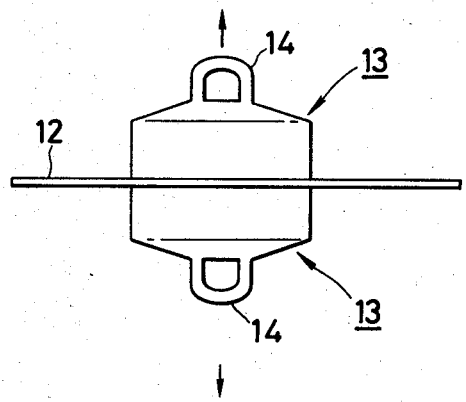
FIG. 2 is an illustration of a test for evaluating the adhesive strength of the protective film.

As shown in FIG. 2, to opposite sides of a specimen 12 of the prepared magnetic recording medium, two cylindrical jigs 13 each having a base area of 1 cm² and provided with a grip 14 were adhered by a two-pack type epoxy resin (trade name: Cemedine Super, supplied by Cemedine K.K.). A test was conducted by pulling the grips 14 in opposite directions, and the position of breakage of the specimen and the force required for the breakage, namely, the adhesive strength, were determined. Breakage occurring between the polyethylene terephthalate film (support) and the thin magnetic metal film was visually confirmed. On the other hand, breakage occurring between the metal film and the protective film was confirmed by ESCA. This method is based on the fact that Co is not detected when the metal film is wholly covered with the plasma-polymerized protective film, but Co is detected when the protective film is broken or removed, even partially.

(4) Thickness and Density of Each Layer

The thickness and density of each layer were determined usin an ESCA device (Model: ESCA 750, supplied by K.K. Shimadzu Seisakusho), a precision balance (AHN®, Recording Microbalance Chan 1000)and an ellipsometer (CAERTNER ®, Ellipsometer L 117). Methods for determination are explained below for the case of the surface layer. The prepared magnetic recording tape was cut to form a circular specimen of 1 cm in diameter, and the specimen was precisely weighed using the balance. The overall thickness (optical thickness) of the protective layer of the specimen was determined by the ellipsometer. The specimen was mounted on the ESCA device, then determination by ESCA and etching with an argon ion beam were repeated to remove only the surface layer, and thereafter the weight of the specimen and the thickness of the protective layer were again determined as above. The weight and the thickness of the surface layer were obtained from the differences between measured values before etching and those after etching. The weight thickness (weight/area) of the surface layer was calculated from the surface area of the specimen, and the density of the surface layer was obtained by dividing the weight thickness by the optical thickness.

EXAMPLES 2 AND 3; COMPARATIVE EXAMPLES 1 TO 3

Magnetic recording media were prepared in the same manner as in Example 1 except that the electric power supplied to the first electrodes 2 or the second electrodes 3 was changed to the values shown in Table 1, and the performances of the recording media were evaluated. The results are also given in Table 1.

TABLE 1

| | Power supplied to Electrode 1 W | Power supplied to Electrode 2 W | Base layer Density g/cm³ | Base layer Thickness Å | Surface layer Density g/cm³ | Surface layer Thickness Å | Scratch[1] resistance pieces | Weather resistance (%) | Adhesive strength kgw/mm² | Position[2] of breakage |
|---|---|---|---|---|---|---|---|---|---|---|
| Example | | | | | | | | | | |
| 1 | 2 | 10 | 1.0 | 80 | 1.6 | 120 | none | 0 | 3.1 | B |
| 2 | 2 | 5 | 1.0 | 80 | 1.3 | 100 | none | 0 | 2.3 | B |
| 3 | 2 | 7.5 | 1.0 | 80 | 1.4 | 110 | none | 0 | 3.0 | B |
| Comparative Example | | | | | | | | | | |
| 1 | 2 | 2 | 1.0 | 80 | 1.0 | 80 | 20 or more | 0 | 2.2 | B |
| 2 | 10 | 10 | 1.6 | 120 | 1.6 | 120 | 5~7 | 90 | 1.0 | A |
| 3 | 7.5 | 2 | 1.4 | 110 | 1.0 | 80 | 20 or more | 0 | 2.5 | B |

Notes:
[1] The number of scratches of 12.65 mm (0.5 inch) or longer formed in a 1.265 × 12.65 cm (0.5 × 5 inch) area of the surface of the specimen.
[2] A: between protective film and thin magnetic metal film
B: between thin magnetic metal film and support

EXAMPLE 4

The same reactor as in Example 1 was used except that the length ($l_1$) of the electrode plates of the first electrodes in the feed direction of the tape was 70 cm while that ($l_2$) of the second electrodes was 20 cm and an AC power source with a frequency of 50 Hz was used.

Ethane, as a monomer gas, was introduced into the reaction vessel at a constant flow rate of 150 cc (STP)/min, and plasma polymerization was conducted at a controlled pressure of 80 mTorr by supplying electric power of 2 kW to both the first electrodes and the second electrodes. The electron temperature of the plasma during polymerization was $2.5 \times 10^4$ K. on the side of the first electrodes and $5.8 \times 10^4$ K. on the side of the second electrodes. The feed rate of the base material tape was controlled to 140 cm/min. As a result, a magnetic recording medium having a protective film formed on the thin magnetic metal film of the tape was obtained, in which the protective film consisted of a base layer having a density of 1.0 g/cm³ and a thickness of 110 Å and a surface layer having a density of 1.6 g/cm³ and a thickness of 20 Å. The densities and the thicknesses of the base layer and the surface layer were determined by the method described in Example 1.

The scratch resistance of the magnetic recording medium thus obtained was evaluated in the same manner as in Example 1 except that a home-use VTR Model SL.F1 produced by Sony Corp. was used in βII mode.

The abrasion resistance of the magnetic recording medium was tested under a temperature of 23° C. and a relative humidity of 65% by the following method.

Figure 3:
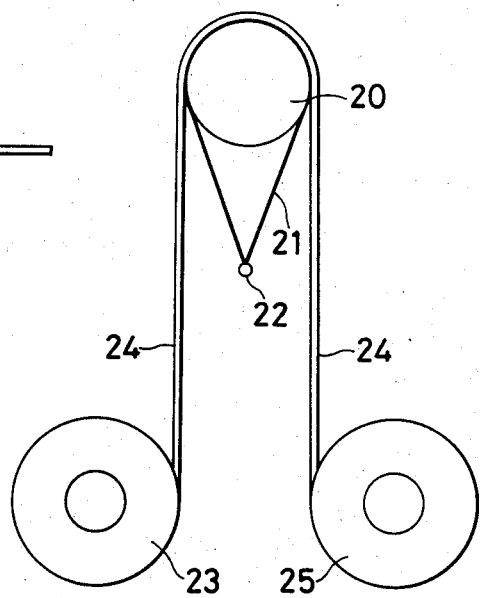
FIG. 3 is an illustration of an abrasion resistance test.

Abrasion Resistance Test:

Abrasion resistance was tested using the device shown in FIG. 3. In the figure, an abrasive tape (trade said lengths ($l_1$, $l_2$). The electron temperature of the plasmas was the same as in Example 4. The density and the thickness of the base layer and the surface layer of the protective film of each of the magnetic recording media thus obtained are given in Table 2, together with evaluations of the performance of the media.

TABLE 2

|  | First electrodes | | Second electrodes | | Base layer | | Surface layer | | Scratch resistance number | Abraded powder (%)[1] |
| --- | --- | --- | --- | --- | --- | --- | --- | --- | --- | --- |
|  | Length ($l_1$) cm | Power supplied kW | Length ($l_2$) cm | Power supplied kW | Thickness Å | Density g/cm³ | Thickness Å | Density g/cm³ | | |
| Example | | | | | | | | | | |
| 4 | 70 | 2 | 20 | 2 | 110 | 1.0 | 20 | 1.6 | none | none |
| 5 | 70 | 2 | 40 | 4 | 110 | 1.0 | 40 | 1.6 | 1 | 5 |
| 6 | 35 | 1 | 10 | 1 | 55 | 1.0 | 10 | 1.6 | none | none |
| Comparative Example | | | | | | | | | | |
| 7 | 35 | 1 | 10 | 1 | 100 | 1.5 | 18 | 1.3 | none | none |
| 8 | 35 | 1 | 14 | 1.4 | 100 | 1.5 | 25 | 1.3 | none | none |
| 9 | 18 | 0.5 | 5 | 0.5 | 50 | 1.5 | 7 | 1.3 | none | none |

Note:
[1] The proportion of the side of the abrasive tape brought into contact with the specimen tape which was covered with the abraded powder.

name: #L-1000, supplied by Fuji Photo Film Co., Ltd.) 21 is placed, with the abrasive surface on the outside, on a horizontally disposed steel cylinder 20 and the tape 21 is tautly fixed by a pin 22. A specimen tape 24 wound around a lower reel 23 is also fitted to the cylinder 20 so that the side of the thin magnetic metal film provided thereon with the protective film makes contact with the abrasive tape 21, and the tape 24 is wound around another reel 25. Reciprocal running of the specimen tape 24 between the reels 23 and 25 was repreated 50 times under the conditions of a running distance of 2 m, a running speed of 3 cm/sec and a back tension of 50 gw to bring the magnetic metal film into repeated frictional contact with the abrasive tape. The accumulation of the abraded powder on the surface of the abrasive tape was observed through a loupe, and the proportion of the side of the abrasive tape brought into contact with the specimen tape which was covered with the abraded powder was determined.

EXAMPLES 5 and 6

Magnetic recording media were prepared in the same manner as in Example 4 except that the length ($l_1$, $l_2$) of the electrode plates of the first electrodes and the second electrodes was changed to the values shown in Table 2 and electric power supplied was changed so as to prevent the energy density between the respective electrode plates (power supplied divided by the volume of the space between the electrode plates) from being changed by the changes in said lengths ($l_1$, $l_2$). The electron temperature of plasmas was the same as in Example 4. The density and the thickness of the base layer and the surface layer of the protective film of each of the magnetic recording media thus obtained are given in Table 2, together with evaluations of the performance of the media.

EXAMPLES 7 to 9

Magnetic recording media were prepared in the same manner as in Example 4 except that tetrafluoroethylene was used as a monomer gas, the length ($l_1$, $l_2$) of the electrode plates of the first electrodes and/or the second electrodes was changed to the values shown in Table 2, and the electric power supplied was changed so as to prevent the energy density between respective electrode plates from being changed by the changes in

EXAMPLE 10

Figure 4:
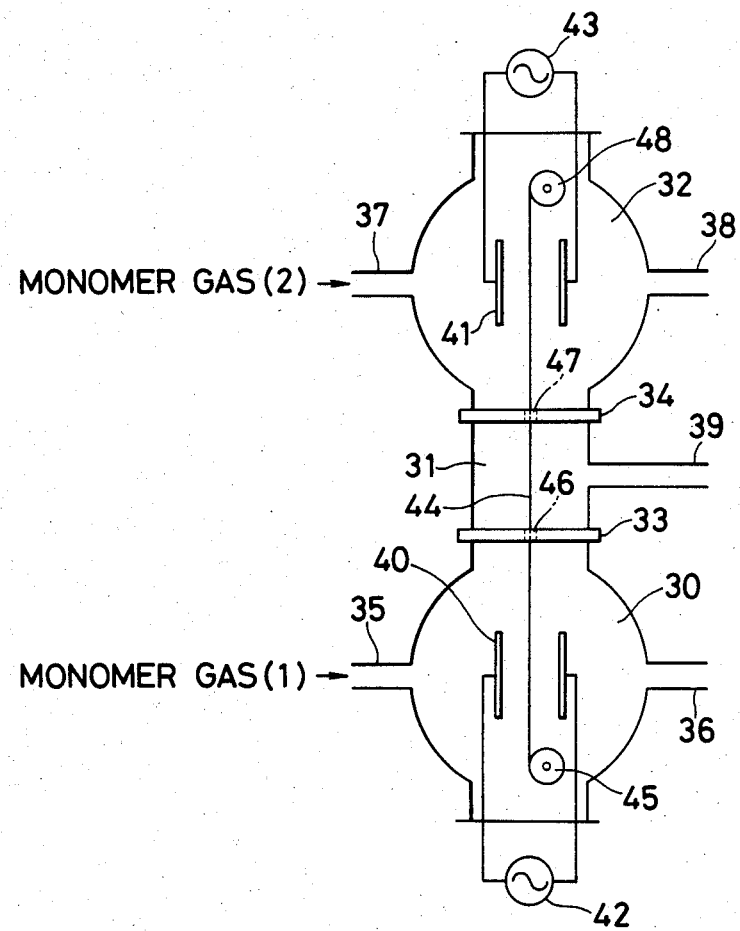
FIG. 4 shows schematically another apparatus used for forming a protective film by plasma polymerization.

A magnetic recording medium was prepared using the device schematically shown in FIG. 4. The device consists of a reaction chamber 30 with an internal volume of 30 l and a second reaction chamber 32 with an internal volume of 30, l which are separated from each other by partition walls 33, 34. The first reaction chamber 30 is provided with a feed pipe 35 for a monomer gas and a gas discharge pipe 36, and the second reaction chamber 32 also is provided with a feed pipe 37 for a monomer gas and a gas discharge pipe 38. A differential gas discharge chamber 31 is provided with a gas discharge pipe 39 for differential evacuation. In the first and second reaction chambers 30 and 32, there are respectively provided first electrodes 40 and second electrodes 41 of the parallel flat plate type (both consisting of 10×10 cm square stainless steel plates, with a spacing of 5 cm therebetween), which are connected respectively with HF power sources 42 and 43 for excitation of plasma. A base material tape 44 of 5 cm in width previously provided on its surface with a thin magnetic metal film is wound on a roll 45 in the first reaction chamber, passed between the electrode plates of the first electrodes 40, and then passed sequentially through a slit 46 provided in the partition wall 33, the differential gas discharge chamber 31 and a slit 47 provided in the partition wall 34, and then passed between the electrode plates of the second electrodes 41 to be taken up on a roll 48. The base layer of the protective film is formed on the magnetic metal film of the tape 44 by plasma polymerization in the first reaction chamber, and the surface layer of the protective film is then formed thereon by plasma polymerization in the second reaction chamber.

In operating the device, after avacuating each reaction chamber, monomer gases are introduced through the feed pipes, and while controlling the pressures in the chambers by varying the gas discharge rates, electric power is supplied to the electrodes to generate plasma, thereby effecting polymerization, as described above for the device shown in FIG. 1. The pressure in each of the reaction chambers is measured by a pressure indicator (not shown) and is controlled. The electron temperature of the plasma during polymerization is determined using the same probe as in Example 1. Discharge of gases through the differential gas discharge chamber 31 is appropriately carried out so that the gases in the reaction chambers do not mix with each other in the reaction chambers.

In this example, plasma polymerization was carried out under the following conditions. Butadiene was used as a monomer gas to be fed into the first reaction chamber (hereinafter referred to as "monomer gas (1)") and was fed at a flow rate of 2 cc (STP)/min and a pressure of 50 mTorr. Electric power of 40 W was supplied to the first electrodes 40. On the other hand, methane was used as a monomer gas to be supplied into the second reaction chamber (hereinafter referred to as "monomer gas (2)") and was fed at a flow rate of 1 cc (STP)/min and a pressure of 50 mTorr. Electric power of 100 W was supplied to the second electrodes 41. The electron temperature during polymerization was from $1.5 \times 10^4$ to $2.5 \times 10^4$ K. on the side of the first electrodes and from $5.5 \times 10^4$ to $6.5 \times 10^4$ K. on the side of the second electrodes. The same base material tape as in Example 1 was passed through the device at a feed rate of 20 cm/min, whereby a plasma-polymerized film of butadiene having a density of 0.9 g/cm$^3$ and a thickness of 100 Å was formed on the tape as the base layer of the protective film, and a plasma-polymerized film of methane into the second reaction chamber (that is, plasma polymerization was not carried out in the second reaction chamber) and the feed rate of the base material tape was modified. The thickness and the density of each layer of the protective film of each of the magnetic recording media thus obtained are given in Table 3, together with evaluations of performance of the media. The feed rate of the tape was set at 12 cm/min (Comparative Example 6), 11 cm/min (Comparative Example 7) and 9 cm/min (Comparative Example 8).

EXAMPLE 14

By using only the first reaction chamber of the device shown in FIG. 4 and using ethane as a monomer gas, plasma polymerization was carried out under the same conditions as in Example 10 to form a base layer on a base material tape. Then, the tape was exposed to air for 10 min by introducing air into the first reaction chamber. Thereafter, by using again only the first reaction chamber, plasma polymerization was carried out under the same conditions as those for the base layer to form a surface layer on the base layer, thereby obtaining a magnetic recording medium. The thickness and the density of each layer of the protective film of the magnetic recording medium as well as the evaluations of the performance of the medium are given in Table 3.

TABLE 3

| | Monomer gas (1) | Monomer gas (2) | Base layer Density g/cm$^3$ | Base layer Thickness Å | Surface layer Density g/cm$^3$ | Surface layer Thickness Å | Scratch resistance number | Weather resistance (%) | Adhesive strength kgw/mm$^2$ | Position[1] of breakage |
|---|---|---|---|---|---|---|---|---|---|---|
| Example | | | | | | | | | | |
| 10 | butadiene | methane | 0.9 | 100 | 1.4 | 70 | none | 0 | 3.0 | B |
| 11 | butadiene | difluoro-ethylene | 0.9 | 100 | 1.4 | 100 | none | 0 | 2.9 | B |
| 12 | ethylene | methane | 1.0 | 90 | 1.4 | 70 | none | 0 | 2.8 | B |
| 13 | butadiene | trimethyl-silane | 0.9 | 90 | 1.3 | 80 | none | 0 | 3.1 | B |
| 14 | methane | — | 1.4 | 70 | 1.4 | 70 | none | 0 | 2.7 | B |
| Comparative Example | | | | | | | | | | |
| 4 | butadiene | propylene | 0.9 | 100 | 1.0 | 120 | 3–4 | 0 | 3.0 | B |
| 5 | cyclohexane | methane | 0.6 | 80 | 1.5 | 70 | 5–7 | 10 | 1.8 | A |
| 6 | butadiene | — | 0.9 | 170 | — | — | 20 or more | 0 | 3.0 | B |
| 7 | ethylene | — | 1.0 | 160 | — | — | 20 or more | 10 | 2.8 | B |
| 8 | ethane | — | 1.3 | 130 | — | — | 20 or more | 0 | 1.8 | A |

Note:
[1]A: between protective film and thin magnetic metal film
B: between thin magnetic metal film and support having a density of 1.5 g/cm$^3$ and a thickness of 70 Å was formed thereon to give a magnetic recording medium. The performance of the magnetic recording medium thus obtained was evaluated in the same manner as in Example 1, the results being given in Table 3.

EXAMPLES 11 to 13; COMPARATIVE EXAMPLES 4 and 5

Magnetic recording media were prepared in the same manner as in Example 10 except that the monomer gas (1) and/or the monomer gas (2) used in Example 10 was replaced by the monomeric compounds given in Table 3. The thickness and the density of each layer of the protective film of each of the magnetic recording media thus obtained are given in Table 3, together with evaluations of the performance of the media.

COMPARATIVE EXAMPLES 6 to 8

Magnetic recording media were prepared in the same manner as in Example 10 except that the monomer gas (1) used in Example 1 was replaced by the monomeric compounds given in Table 3, no monomer gas was fed

EXAMPLE 15

The same reactor as that of FIG. 4 used in Example 10 was used except that the length ($l_1$) of the first electrodes in the feed direction of the tape was 10 cm while that ($l_2$) of the second electrodes was 3 cm.

In this example, plasma polymerization was carried out under the following conditions. Butadiene was used as the monomer gas (1) and was fed at a flow rate of 2 cc (STP)/min and a pressure of 50 mTorr. Electric power of 40 W was supplied to the first electrodes. On the other hand, a gaseous mixture of methane and tetrafluoromethane in a molar ratio of 2:1 was used as the monomer gas (2) and was fed at a flow rate of 1 cc (STP)/min and a pressure of 50 mTorr. Electric power of 100 W was supplied to the second electrodes. The same base material tape as that used in Example 1 was passed through the reactor at a feed rate of 50 cm/min, whereby a plasma-polymerized film of butadiene having a density of 0.9 g/cm$^3$ and thickness of 60 Å was formed on the tape as the base layer of the protective film, and a polymerized film of the gaseous mixture of methane and tetrafluoromethane having a density of 1.8 g/cm³ and a thickness of 15 Å was formed thereon as the surface layer to give a magnetic recording medium. The scratch resistance and abrasion resistance of the magnetic recording medium thus obtained were evaluated in the same manner as described above, the results being given in Table 4.

EXAMPLES 16 and 17

A magnetic recording medium was prepared in the same manner as in Example 10 except that the length ($l_1$, $l_2$) of the electrode plates of the first electrodes and the second electrodes in Example 15 was changed to the values given in Table 4. The thickness and the density of each layer of the protective film of the magnetic recording medium thus obtained are given in Table 4, together with evaluations of performance of the medium.

TABLE 4

| Example | First electrode Length ($l_1$) cm | Second electrode Length ($l_2$) cm | Base layer Thickness Å | Base layer Density g/cm³ | Surface layer Thickness Å | Surface layer Density g/cm³ | Scratch resistance number[1] | Abraded powder %[2] |
|---|---|---|---|---|---|---|---|---|
| 15 | 10 | 3 | 60 | 0.9 | 15 | 1.8 | none | none |
| 16 | 10 | 6 | 60 | 0.9 | 30 | 1.8 | none | none |
| 17 | 15 | 2 | 90 | 0.9 | 10 | 1.8 | none | none |

Notes:
[1]Number of scratches formed.
[2]The proportion of the side of the abrasive tape brought into contact with the specimen tape which was covered with the abraded powder.

What we claim is:

1. A magnetic recording medium of improved scratch and weathering resistance, comprising:
   a non-magnetic support;
   a thin magnetic metal film provided on said support; and
   a protective film having high abrasion resistance and an extremely small spacing loss formed on said thin magnetic metal film, said protective film having a thickness which does not exceed 500 Å comprising a plurality of layers formed by plasma polymerization and constituted at least of a base layer of a thickness of from 10–450 Å and having a density of from 0.7 to 1.5 g/cm³ formed directly on said thin magnetic metal film and a surface layer of a thickness of from 3–450 Å and having a density of not less than 1.2 g/cm³.

2. The magnetic recording medium according to claim 1 wherein said base layer has a density of from 0.7 to 1.2 g/cm³ and said surface layer has a density of from 1.4 to 2.2 g/cm³.

3. The magnetic recording medium according to claim 1 wherein said protective film has at least one intermediate layer between said base layer and said surface layer.

4. The magnetic recording medium according to claim 1, wherein the layers of the protective film are formed by plasma polymerization of at least one monomeric compound selected from the group consisting of linear or cyclic saturated hydrocarbons having up to 10 carbon atoms, linear or cyclic unsaturated hydrocarbons having up to 10 carbon atoms, halogenated hydrocarbons having 1 to 4 carbon atoms, silicon compounds substituted by at least one member selected from the group consisting of hydrocarbon radicals and halogen, nitrogen-containing organic compounds and sulfur-containing organic compounds.

5. The magnetic recording medium according to claim 4 wherein the base layer of the layers of the protective film is formed by plasma polymerization of at least one monomeric compound selected from the group consisting of saturated aliphatic or alicyclic hydrocarbons having up to 8 carbon atoms, unsaturated aliphatic hydrocarbons having up to 8 carbon atoms, aromatic hydrocarbons having 6 to 8 carbon atoms, fluorinated lower alkanes, lower organosilanes, lower organosiloxanes and fluorinated lower silanes.

6. The magnetic recording medium according to claim 5 wherein the base layer is formed by plasma polymerization of propylene, butadiene, benzene, styrene, methane, ethane, propane, butane, octane, cyclohexane, diallylsilane, diallyldimethylsilane, divinyltetramethyldisilane, propylmethyldivinylsilane, monofluoromethane, difluoromethane, trifluoromethane or mixtures thereof, or mixtures of at least one said compounds with tetrafluoromethane and/or tetrafluorosilane.

7. The magnetic recording medium according to claim 4, wherein the surface layer of the protective film is formed by plasma polymerization of at least one monomeric compound selected from the group consisting of saturated or unsaturated aliphatic hydrocarbons having 1 to 4 carbon atoms, fluorinated or chlorinated, saturated or unsaturated aliphatic hydrocarbons having 1 to 4 carbon atoms, lower organosilanes, lower organosiloxanes and fluorinated lower silanes.

8. The magnetic recording medium according to claim 7, wherein the surface layer is formed by plasma polymerization of methane, ethane, propane, ethylene, monomethylsilane, dimethylsilane, trimethylsilane, difluoroethylene, monofluoromethane, difluoromethane, trifluoromethane, monofluorosilane, difluorosilane, trifluorosilane, octylsilane, decamethylcyclopentasiloxane or mixtures thereof, or mixtures of at least one said compounds with tetrafluoromethane and/or tetrafluorosilane.

9. A process for producing a magnetic recording medium of improved scratch and weathering resistance comprising a non-magnetic support, a thin magnetic metal film provided on said support and a protective film of a thickness which does not exceed 500 Å which has high abrasion resistance and an extremely small spacing loss formed on said thin magnetic metal film and which consists of a plurality of layers formed by plasma polymerization, which comprises the steps of:
   forming a first layer of a thickness of from 10–450 Å on said thin magnetic metal film or on a previously formed layer, by plasma polymerization of a first monomer gas such that the layer has a density of from 0.7 to 1.5 g/cm³; and
   forming a second layer of a thickness of from 3–450 Å on said first layer by plasma polymerization of a second monomer gas, which layer has a density of not less than 1.2 g/cm³, which second layer is distinguishable from said first layer.

10. The process according to claim 9 wherein the first and the second monomer gases are the same in composition but the plasmas of the first monomer gas and the second monomer gas differ in energy density, thereby producing first and second layers which have different in physical and/or chemical characteristics.

11. The process according to claim 10, wherein the support provided thereon with the thin magnetic metal film is passed through two plasma zones which differ in energy density provided in a single chamber containing a single monomer gas.

12. The process according to claim 9 wherein the first and the second monomer gases differ in composition, thereby producing first and second layers which differ in chemical constitution.

13. The process according to claim 12 wherein the support provided thereon with the thin magnetic metal film is passed through a first reaction chamber where plasma of the first monomer gas is generated and then through a second reaction chamber where plasma of the second monomer gas is generated.

14. The process according to claim 9, wherein the first layer formed is exposed to oxygen, or air before the formation of the second layer, thereby producing first and second layers partitioned by a modified interface therebetween.

15. The process according to claim 14, wherein the first and the second layers are formed from the same monomer gas under the same conditions.

* * * * *